(12) United States Patent
Acharya et al.

(10) Patent No.: US 7,242,693 B1
(45) Date of Patent: Jul. 10, 2007

(54) METHOD AND APPARATUS FOR FIBER AUTONEGOTIATION

(75) Inventors: Yatin Acharya, Santa Clara, CA (US); William Lo, Cupertino, CA (US); Sundeep Gupta, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 1066 days.

(21) Appl. No.: 10/364,602

(22) Filed: Feb. 11, 2003

Related U.S. Application Data

(60) Provisional application No. 60/443,660, filed on Jan. 30, 2003.

(51) Int. Cl.
 *H04L 12/413* (2006.01)
(52) U.S. Cl. .................... 370/445; 370/463
(58) Field of Classification Search .............. None
 See application file for complete search history.

(56) References Cited

U.S. PATENT DOCUMENTS

| | | | | |
|---|---|---|---|---|
| 5,586,117 | A * | 12/1996 | Edem et al. ............. | 370/466 |
| 5,809,249 | A * | 9/1998 | Julyan ................... | 709/223 |
| 6,026,494 | A * | 2/2000 | Foster ................... | 713/320 |
| 6,215,816 | B1 * | 4/2001 | Gillespie et al. ........ | 375/219 |
| 6,457,055 | B1 * | 9/2002 | Hwong et al. ........... | 709/227 |
| 6,504,849 | B1 * | 1/2003 | Wang et al. ............. | 370/455 |
| 6,883,025 | B2 * | 4/2005 | Andra et al. ............ | 709/220 |

OTHER PUBLICATIONS

Bunch, Auto-Negotiation and Gigabit Ethernet? National Semiconductor, pp. 1-11, Nov. 1996.*
IEEE Std 802.3u, Physical Layer Link signaling for 10 Mb/s and 100 Mb/s Auto-Negotiation on twisted pair, IEEE, pp. 235-280, 1995.*
(Revision of IEEE Std. 802.3, 2000 Edition); 802.3 IEEE Standard for Information Technology— Telecommunications and Information exchange between systems—Local and metropolitan area networks—Specific requirements; Part 3: Carrier sense multiple access with collision detection (CSMA/CD) access method and physical layer specifications; Mar. 8, 2002.

* cited by examiner

*Primary Examiner*—Frank Duong

(57) ABSTRACT

A first network device includes a first physical layer device with a first autonegotiation circuit. A bypass timer determines a predetermined period. A second network device includes a second physical layer device. The first network device enables autonegotiation bypass and establishes a link with the second network device after the predetermined period during which a link between the first and second network devices is not up, a receiver of the first physical layer device is in sync, and an ability detect state of the first autonegotiation circuit is true. The first autonegotiation circuit resets the predetermined period of the bypass timer when configuration code groups are received from the second network device. When the first network device receives idle code groups followed by data code groups, the first autonegotiation circuit does not return to an autonegotiation enable state.

82 Claims, 6 Drawing Sheets

METHOD AND APPARATUS FOR FIBER AUTONEGOTIATION

CROSS-REFERENCE TO RELATED APPLICATIONS

This application claims the benefit of U.S. Provisional Application No. 60/443,660, filed on Jan. 30, 2003. The disclosure of the above application is incorporated herein by reference.

FIELD OF THE INVENTION

The present invention relates to Ethernet networks, and more particularly to auto-negotiation and autonegotiation bypass modes in Ethernet networks.

BACKGROUND OF THE INVENTION

Communications between computers, peripheral devices, Internet appliances and other network devices increasingly require higher data transfer rates to handle multimedia and other rich content. Communication media such as twisted pair cable, fiber and wireless links with increased data carrying capacity are now being used to meet the increased data carrying demands.

The network devices have varying communication abilities and may use different types of media. For example, a first network device or link partner may be able to communicate wirelessly with a second link partner at a first rate such as 10 Megabits per second (Mbps). A third network device or link partner may communicate with a fourth link partner at Gigabit per second rates over fiber. A fifth network device or link partner may communicate over copper media with a sixth link partner at Gigabit or sub-Gigabit speeds. Because of the variable types of media that are used and the different communication speeds, accommodation must be made for situations where the prospective link partners have different communication abilities.

The physical layer device (PHY) of some network devices includes an autonegotiation circuit, which initiates an exchange of information between two link partners. The autonegotiation circuit automatically configures the link partners to take maximum advantage of their respective abilities. During auto-negotiation, the link partners advertise their abilities using configuration code groups, acknowledge receipt, identify common modes of operation, and reject the use of operational modes that are not shared or supported by both link partners. When more than one common mode of operation exists between the network devices, an arbitration function of the autonegotiation circuit identifies and selects a single mode of operation. After auto-negotiation is complete, the devices establish a link and exchange data.

Auto-negotiation on some media types such as fiber requires that both of the link partners support auto-negotiation functionality before a link between the link partners can be automatically established. If one link partner implements auto-negotiation and the other link partner does not, two-way communications cannot be established without manual intervention. A user must disable auto-negotiation and manually configure both link partners to work in the same operational modes.

SUMMARY OF THE INVENTION

An Ethernet network includes a first network device including a first physical layer device with a first autonegotiation circuit that includes a bypass timer that determines a predetermined period. A second network device includes a second physical layer device and communicates over a first medium with the first network device. The first network device enables autonegotiation bypass and establishes a link with the second network device after the predetermined period during which a link between the first and second network devices is not up, a receiver of the first physical layer device is in sync, and an ability detect state of the first autonegotiation circuit is true.

In other features, when the predetermined period expires, the autonegotiation circuit brings up the link using default settings. The second physical layer device includes a second autonegotiation circuit that sends consecutive, non-matching configuration code groups and/or corrupt data to the first network device to delay bypass. The first autonegotiation circuit resets the predetermined period of the bypass timer when configuration code groups and/or corrupt data are received from the second network device.

In other features, the second network device is an interface converter such as a gigabit interface converter. The interface converter includes a third physical layer device with a third autonegotiation circuit. A second medium communicates with the third physical layer device of the interface converter. A third network device includes a fourth physical layer device with a fourth autonegotiation circuit and communicates with third physical layer device of the interface converter over the second medium. The first medium can be fiber and the second medium can be copper.

In still other features, the first autonegotiation circuit of the first network device identifies when the second network device sends idle code groups that are followed by data code groups during the predetermined period and prevents the first autonegotiation circuit from returning to an autonegotiation enable state. The first autonegotiation circuit suppresses assertion of RUDI(INVALID) signal when the second network device sends idle code groups that are followed by data code groups during the predetermined period.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
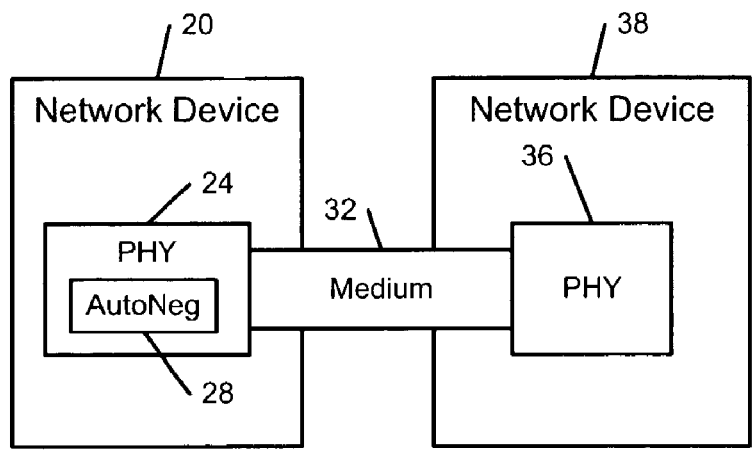
FIG. 1 is a functional block diagram illustrating a first autonegotiation-enabled link partner and a second autonegotiation-disabled link partner.

The following description of the preferred embodiment(s) is merely exemplary in nature and is in no way intended to limit the invention, its application, or uses. For purposes of clarity, the same reference numbers will be used in the drawings to identify similar elements.

Referring now to FIG. 1, a first network device 20 or first link partner includes a physical layer device (PHY) 24 with an autonegotiation circuit 28. The autonegotiation circuit 20 preferably implements fiber autonegotiation in accordance with IEEE sections 802.3 and/or 802.3Z, which are hereby incorporated by reference, although other network devices with different autonegotiation circuits and different media types are contemplated. The physical layer device 24 is connected by a first medium 32 such as fiber, copper or any other medium to a physical layer device 36 of a second network device 38 or second link partner. The second network device 38 is autonegotiation-disabled. In other words, the physical layer device 36 may have an autonegotiation circuit that is not operating correctly and/or may not have an autonegotiation circuit at all. The network devices 20 and 38 may communicate at 10 Mbps, 100 Mbps, 1000 Mbps or any other speed.

Figure 2:
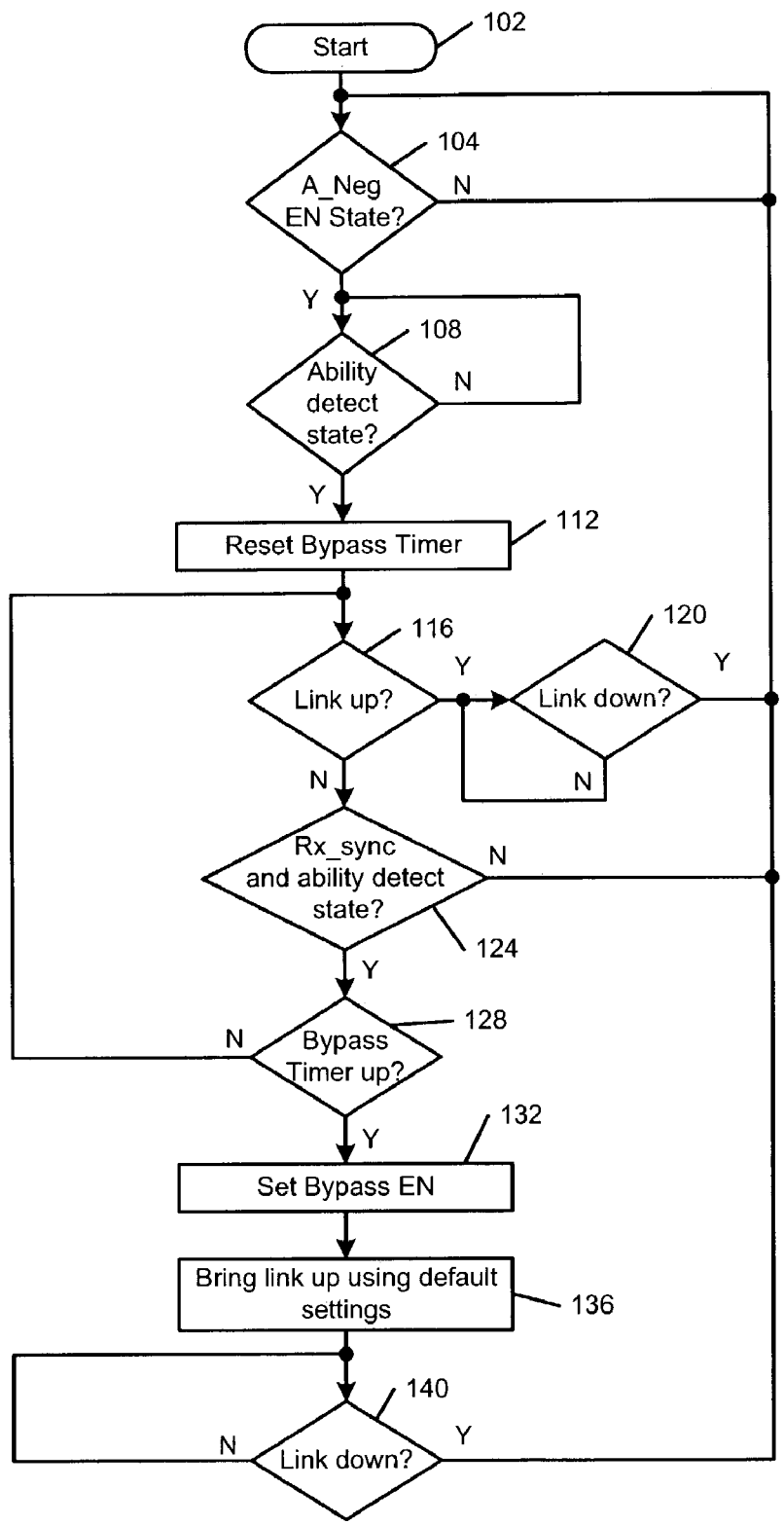
FIG. 2 illustrates steps of a bypass method for automatically establishing a link between the link partners shown in FIG. 1.

Referring now to FIG. 2, the autonegotiation procedure that is performed by the autonegotiation circuit 28 and that is set forth in IEEE section 802.3Z is modified to include a bypass mode of operation. The bypass mode allows a link to be established when the second network device 38 is not autonegotiation enabled. Control begins with step 102. In step 104, control determines whether the autonegotiation enable state of the autonegotiation circuit 28 is true. If the autonegotiation enable state is false, control loops back to step 104. If the autonegotiation enable state is true, control continues with step 108 and determines whether an ability detect state of the autonegotiation circuit 28 is true.

If the ability detect state is false, control loops back to step 108. If the ability detect state is true, control resets a bypass timer of the autonegotiation circuit 28 in step 112. In step 116, control determines whether a link between the link partners 20 and 38 has been brought up. If the link is up, control continues with step 120 and determines whether the link is down. If the link is not down, control loops back to step 120. If the link is down, control loops back to step 104.

If the link is not up in step 116, control determines whether a receive synchronization state machine of the physical layer device 24 is in sync and the ability detect state is true in step 124. If the receive synchronization state machine is not in sync and/or the ability detect state is false, control loops back to step 104. If both conditions are true, control continues with step 128 and determines whether the bypass timer is up. If the bypass timer is not up, control loops back to step 116. If the bypass timer is up, control continues with step 132 and sets a bypass enable flag. In step 136, control brings up a link (despite the failure to complete autonegotiation between the link partners) using default, predetermined and/or condition-dependent settings. In step 140, control determines whether the link is down. If the link is not down, control loops back to step 140. If the link is down, control loops back to step 104.

The bypass timer of the autonegotiation circuit 28 times out after a predetermined period. In an exemplary embodiment, the predetermined period of the bypass timer is equal to a multiple of a link timer. For example, if the link timer is equal to approximately 10 msec, the predetermined period of the bypass timer is set equal to a multiple of the link timer. For example, the bypass timer can be set to 20 times the link timer or approximately 200 msec.

When the bypass timer expires, the link between the link partners 20 and 38 may be established using a default operational mode. For example, the link may be established using current values of Port_Control_Extend<Fdx_Adv> and Port_Control_Extend<Pause_Adv>, although other default or other values may be used.

As can be appreciated from the foregoing, the link partner 38 can be sending idle code groups, configuration code groups, corrupt data, and/or data code groups. As long as autonegotiation does not complete within the predetermined period of the bypass timer and the other conditions described above are true, a link will be established between the link partners 20 and 38 despite the failure of the link patterns 20 and 38 to autonegotiate. Autonegotiation is restarted when the link partner 38 is capable of autonegotiation.

Figure 3:
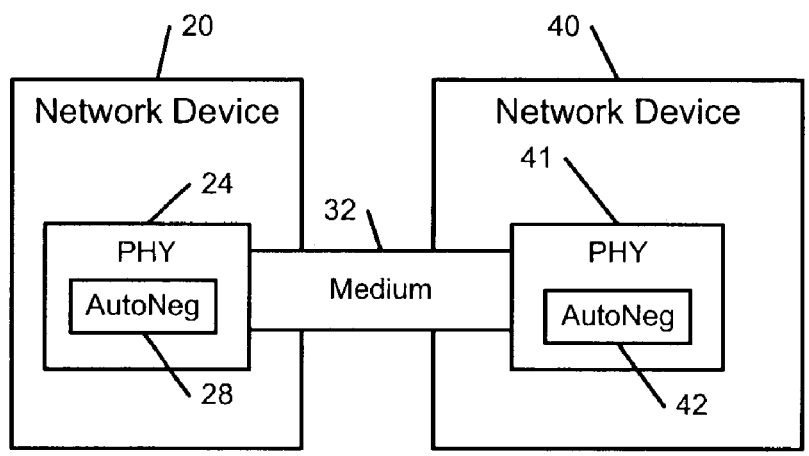
FIG. 3 is a functional block diagram illustrating a first autonegotiation-enabled link partner and a second autonegotiation-enabled link partner.

Referring now to FIG. 3, a second network device 40 includes a physical layer device 41 with an autonegotiation circuit 42. In non-bypass-enabled fiber autonegotiation, the first network device 20 begins autonegotiation with the second network device 40. In some circumstances, the second network device 40 may need to delay completion of autonegotiation with the first network device 20. In order to prevent the first network device 20 from establishing a link, the second network device 40 sends consecutive, non-matching configuration code words and/or corrupt data to the first device 20.

The first network device 20 receives the consecutive, non-matching configuration code words and/or corrupt data and believes that it is performing autonegotiation with the second network device 40. When the second network device 40 is ready to complete autonegotiation, the second network device 40 stops sending the sending the consecutive, non-matching configuration code words and/or corrupt data and begins sending the same configuration code words on consecutive transmissions. The first and second network devices 20 and 40 complete autonegotiation.

Figure 4:
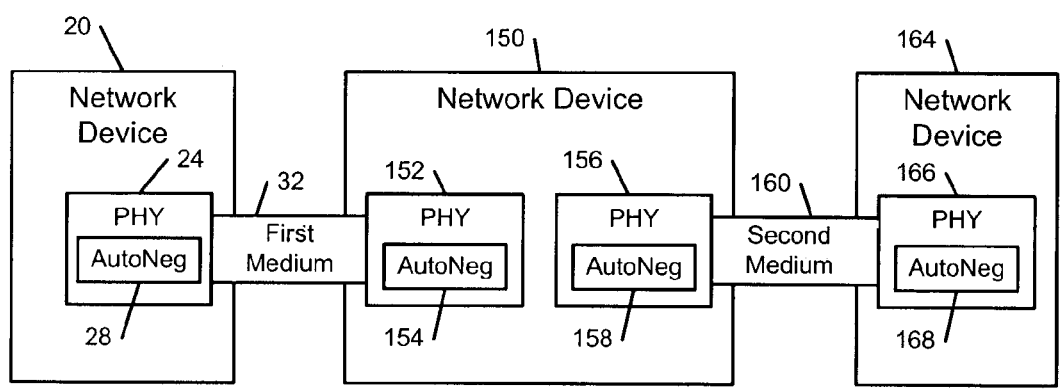
FIG. 4 shows first and second link partners that are connected by an interface converter.

FIG. 4 illustrates an exemplary situation where one network device or link partner needs to delay the completion of autonegotiation with a second network device or link partner. When attempting to provide a link between devices using different types of media, an interface converter 150 is used. As will be described below, autonegotiation of one link may need to be delayed until the other link is up.

In FIG. 4, the network device 20 includes the physical layer device (PHY) 24 with the autonegotiation circuit 28. The autonegotiation circuit 20 preferably implements fiber autonegotiation in accordance with IEEE section 802.3Z, which is hereby incorporated by reference, although other network devices with different autonegotiation circuits can be used. The physical layer device 24 is connected by the first medium 32 to a physical layer device 152 of a second network device 150. The second network device 150 is an interface converter such as a gigabit interface converter (or other type of interface converter) that also includes a second physical layer device 156 with an autonegotiation circuit 158. The physical layer device 156 is connected to a second medium 160, which is connected to a physical layer device 166 of a third network device 164. The physical layer device 166 includes an autonegotiation circuit 168.

In the example shown in FIG. 4, the first medium is fiber and the second medium is copper, although other types of media can be used. The autonegotiation circuits 28 and 154 complete fiber autonegotiation. The autonegotiation circuits 158 and 168 complete copper autonegotiation. The second network device 150 is a gigabit interface converter (GBIC) that provides connectivity between the fiber and copper media.

Since fiber and copper autonegotiation cannot be performed simultaneously, the fiber side autonegotiation is started but not completed and then the copper autonegotiation is completed. The autonegotiation circuit 154 sends consecutive, non-matching configuration code words to the autonegotiation circuit 28 to stall autonegotiation. The autonegotiation circuit 28 sends fiber configuration code words that are received by the autonegotiation circuit 154. The autonegotiation circuit 154 passes along fiber configuration information learned from the received fiber configuration code words to the autonegotiation circuit 158. The autonegotiation circuit 158 generates copper configuration code words that are based on the received fiber configuration code words and transmits the copper configuration code words to the autonegotiation circuit 168. The autonegotiation circuits 158 and 168 complete copper autonegotiation.

After the copper autonegotiation completes, the autonegotiation circuit 158 passes along information relating to the copper autonegotiation to the fiber autonegotiation circuit 154. In other words, the results of the copper side autonegotiation are used to indicate the capabilities of the copper side link partner to the fiber link partner. The autonegotiation circuit 154 sends consecutive, matching configuration code words to the autonegotiation circuit 28 and the fiber link is completed.

Before the copper link is completed, the autonegotiation circuit 154 of the network device 150 waits to enter an ability detect state of the fiber autonegotiation state machine. Once the autonegotiation circuit 154 knows the capabilities of the fiber link partner, the information in the received configuration code groups from the fiber link partner are sent the transmit configuration code group on the copper side autonegotiation.

The bypass function described above in conjunction with FIGS. 1 and 2 waits for autonegotiation to complete within a predetermined period and then brings the fiber link up. In the example set forth above, the predetermined period can be 200 msec. The copper autonegotiation, however, typically takes longer than the predetermined period to complete. Typically, copper autonegotiation takes approximately 3 seconds for gigabit Ethernet applications. Therefore, if enabled, the bypass timer of the fiber link partner will expire before copper autonegotiation can complete and the fiber link partner 20 will bring the link up.

While the network device 150 is waiting for the copper link to complete, the autonegotiation circuit 154 of the network device 150 sends consecutive, non-matching configuration code groups to the fiber link partner 20. The consecutive, non-matching configuration code groups cause the fiber link partner 20 to continue to stay in the ability detect state. If bypass is enabled, however, the fiber link partner 20 will not be "fooled" by the consecutive, non-matching configuration code groups and will attempt to bring up the link by using the bypass function.

A modified bypass method according to the present invention does not allow bypass to occur when configuration code groups are received. In one implementation, the network device 20 resets the bypass timer when the configuration code words are received. In other words, the network device 20 will continue to stay in the ability detect state until the network device 150 is ready to perform fiber autonegotiation after the copper link comes up.

While the present invention is described in the context of a link partners connected by fiber and copper through an interface converter, the present invention applies to any case where one link is stalled until the another side comes up. For example, other media interface converters require a similar mechanism.

Figure 5:
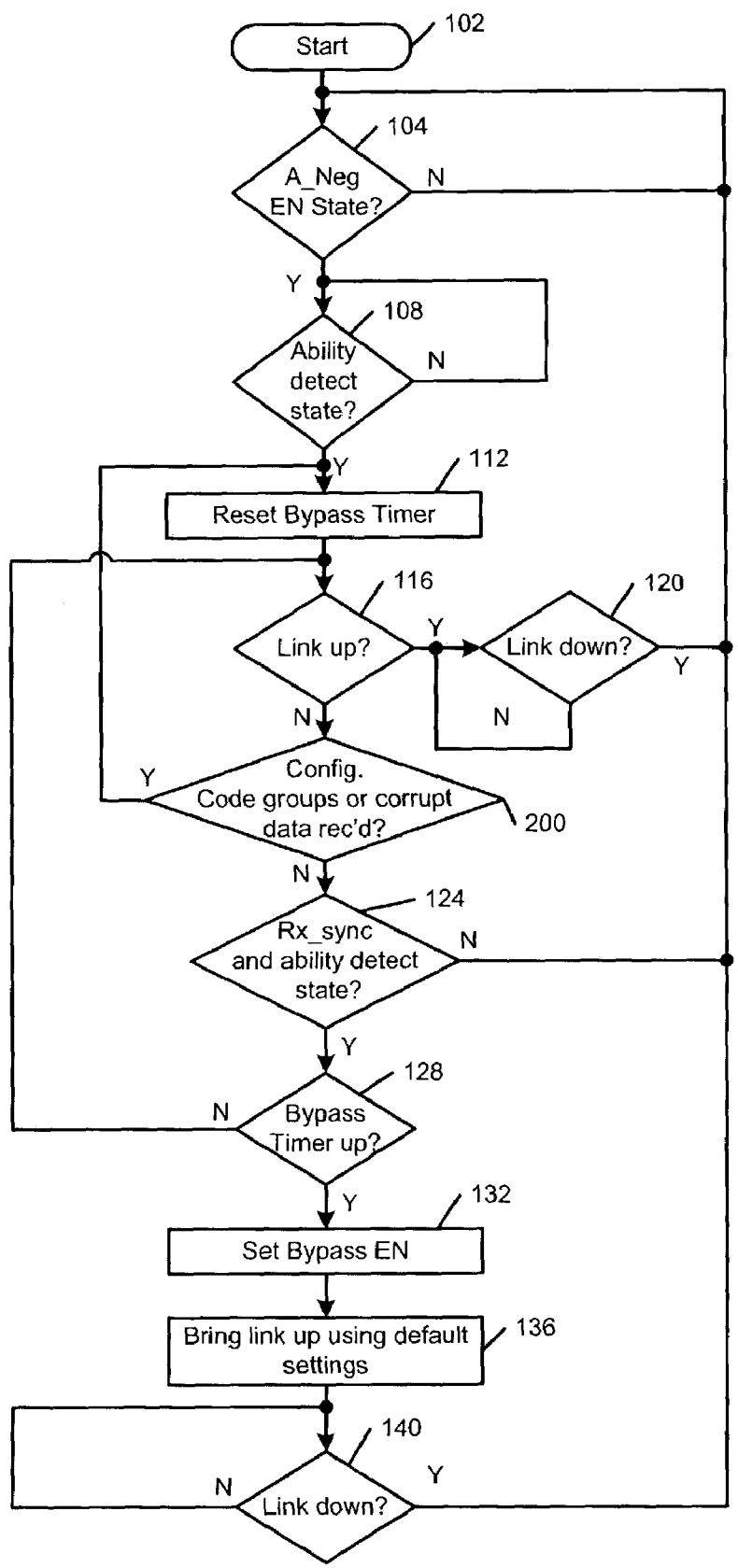
FIG. 5 illustrate steps of a modified bypass method that resets the bypass timer when configuration code groups or corrupt data are received.

Referring now to FIG. 5, the autonegotiation procedure that is performed by the autonegotiation circuit 28 and that is set forth in IEEE section 802.3Z is altered to include the modified bypass mode of operation. A substantial portion of the steps are the same as those previously shown and discussed in conjunction with FIG. 2. However, after step 116 when the link is not up, control determines in step 200 whether configuration code groups or corrupt data are received. If true, control loops back to step 112 and resets the bypass timer. As a result, the bypass mode is not enabled when configuration code groups or corrupt data are received. If idle code groups or data code groups are received, control continues as set forth in FIG. 2.

As can be appreciated from the foregoing, the link partner can be sending idle code groups and/or data code groups. When autonegotiation does not complete within the predetermined period of the bypass timer, a link will automatically be established. Autonegotiation is restarted when the link partner is capable of autonegotiation.

Another problem may occur when one link partner is autonegotiation and bypass enabled as shown in FIGS. 1 and 2 and the other is not or has a faulty autonegotiation circuit. If the network device 38 sends idle code groups and then data code groups before the bypass timer is up, neither autonegotiation nor bypass can occur. The idle code groups followed by data code groups will reset the autonegotiation circuit to an autonegotiation enable state. For example, the network device may generate the idle code groups followed by data code groups in approximately 100 ms. If the bypass timer has a period that is set to 200 ms as set forth in the example above, neither autonegotiation nor bypass can occur. As a result, the link cannot be established.

According to 802.3Z, when the network device receives the idle code groups before data code groups before the bypass timer is up, the autonegotiation state machine of the autonegotiation circuit is reset to the autonegotiation enable state. This reset occurs when the last state of the autonegotiation state machine is equal to Idle_D and the current state of the autonegotiation state machine is equal to RX_INVALID. As a result, RUDI(INVALID) is asserted, which resets the autonegotiation state machine to the autonegotiation enable state. As a result, the link cannot be established.

Figure 6:
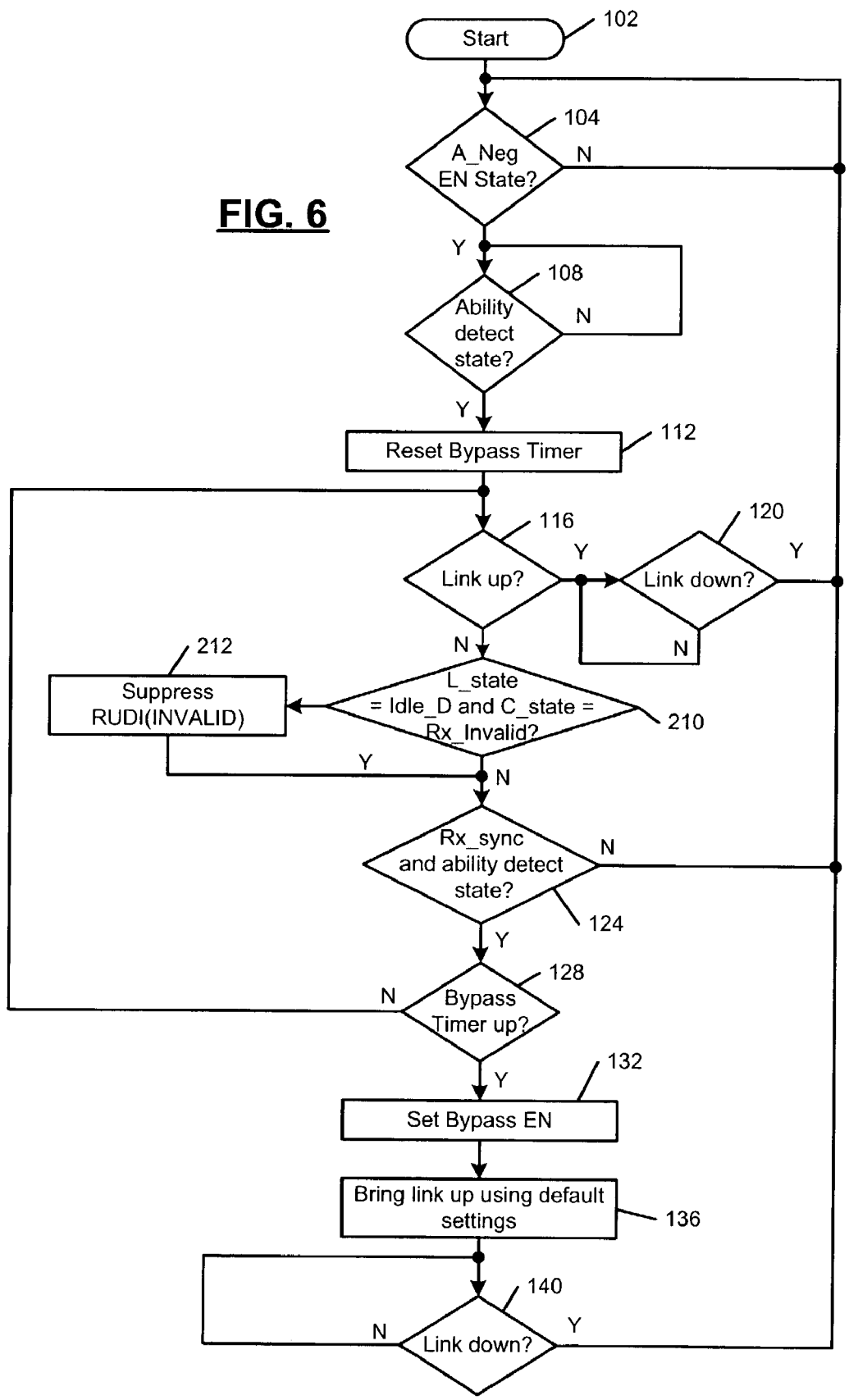
FIG. 6 illustrates steps of FIG. 2 with additional steps to accommodate autonegotiation-disabled link partners that send idle code groups followed by data code groups before a bypass timer expires.

Referring now to FIGS. 1, 2 and 6, an additional step is added to the steps set forth in FIG. 2 according to the present invention to suppress the assertion of RUDI(INVALID) when the last state of the autonegotiation state machine is equal to Idle_D and the current state of the autonegotiation state machine is equal to RX_INVALID. This prevents the autonegotiation state machine from being reset to the autonegotiation enabled state. To that end, control continues from step 116 in FIG. 6 to step 210 where control determines whether the last state of the autonegotiation state machine is equal to Idle_D and the current state of the autonegotiation state machine is equal to RX_INVALID. If true, control continues with step 212 and suppresses RUDI(INVALID).

Control continues with step 124. By suppressing RUDI (INVALID), the autonegotiation state machine is not reset to the autonegotiation enable state and the link partners 20 and 38 can establish the link after the bypass timer is up.

Figure 7:
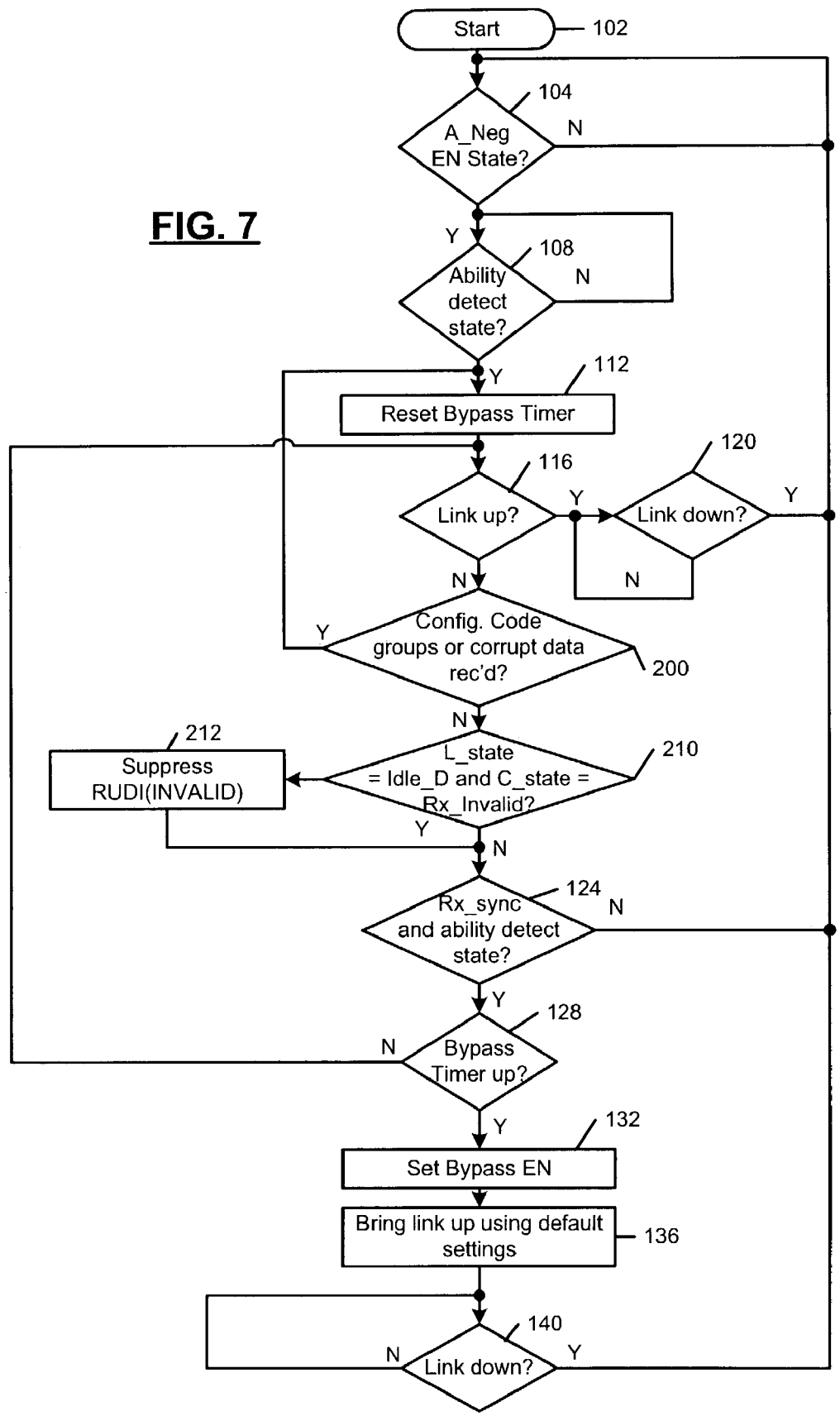
FIG. 7 illustrates steps of FIG. 5 with additional steps to accommodate autonegotiation-disabled link partners that send idle code groups followed by data code groups before a bypass timer expires.

Referring now to FIGS. 1, 5, and 7, the steps 210 and 212 can also be added to the modified bypass of FIG. 5. After step 200, control determines whether the last state of the autonegotiation state machine is equal to Idle_D and the current state of the autonegotiation state machine is equal to RX_INVALID in step 210. If true, control continues with step 212 and suppresses RUDI(INVALID). Control continues with step 124. By suppressing RUDI(INVALID), the autonegotiation state machine is not reset to autonegotiation enable state and the link partners 20 and 38 can establish the link after the bypass timer is up.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An Ethernet network comprising:
   a first network device including a first physical layer device with a receiver and a first autonegotiation circuit having an ability detect state and including a bypass timer that determines a predetermined period;
   a first medium; and
   a second network device that includes a second physical layer device and that communicates over said first medium with said first network device,
   wherein said first network device enables autonegotiation bypass and establishes a link with said second network device after said predetermined period during which a link between said first and second network devices is not up, said receiver of said first physical layer device is in sync, and said ability detect state of said first autonegotiation circuit is true.

2. The Ethernet network of claim 1 wherein when said predetermined period expires, said first autonegotiation circuit brings up said link using default settings.

3. The Ethernet network of claim 1 wherein said first autonegotiation circuit resets said predetermined period of said bypass timer when at least one of configuration code groups and corrupt data are received from said second network device.

4. The Ethernet network of claim 3 wherein said second physical layer device includes a second autonegotiation circuit that sends said at least one of consecutive, non-matching configuration code groups and said corrupt data to said first network device to delay bypass.

5. The Ethernet network of claim 1 wherein said second network device is an interface converter.

6. The Ethernet network of claim 5 wherein said interface converter is a gigabit interface converter.

7. The Ethernet network of claim 5 wherein said interface converter includes a third physical layer device with a third autonegotiation circuit and further comprising:
   a second medium that communicates with said third physical layer device of said interface converter; and
   a third network device that includes a fourth physical layer device with a fourth autonegotiation circuit and that communicates with said third physical layer device of said interface converter over said second medium.

8. The Ethernet network of claim 7 wherein said first medium is fiber and said second medium is copper.

9. The Ethernet network of claim 1 wherein said first autonegotiation circuit of said first network device identifies when said second network device sends idle code groups that are followed by data code groups during said predetermined period and prevents said first autonegotiation circuit from returning to an autonegotiation enable state.

10. The Ethernet network of claim 9 wherein said first autonegotiation circuit suppresses assertion of a RUDI(INVALID) signal when said second network device sends idle code groups that are followed by data code groups during said predetermined period.

11. An Ethernet network comprising:
    a first network device including a first physical layer device with a receiver and a first autonegotiation circuit having an ability detect state and including a bypass timer that determines a predetermined period;
    a first medium; and
    a second network device that includes a second physical layer device and that communicates over said first medium with said first network device,
    wherein said first network device enables autonegotiation bypass and establishes a link with said second network device after said predetermined period during which a link between said first and second network devices is not up, said receiver of said first physical layer device is in sync, and said ability detect state of said first autonegotiation circuit is true, and
    wherein said first autonegotiation circuit resets said predetermined period of said bypass timer when at least one of configuration code groups and corrupt data are received from said second network device.

12. The Ethernet network of claim 11 wherein when said predetermined period expires, said first autonegotiation circuit brings up said link using default settings.

13. The Ethernet network of claim 11 wherein said second physical layer device includes a second autonegotiation circuit that sends at least one of consecutive, non-matching configuration code groups and corrupt data to said first network device to delay bypass.

14. The Ethernet network of claim 11 wherein said second network device is an interface converter.

15. The Ethernet network of claim 14 wherein said interface converter is a gigabit interface converter.

16. The Ethernet network of claim 14 said interface converter includes a third physical layer device with a third autonegotiation circuit and further comprising:
    a second medium that communicates with said third physical layer device of said interface converter; and
    a third network device that includes a fourth physical layer device with a fourth autonegotiation circuit and that communicates with said third physical layer device of said interface converter over said second medium.

17. The Ethernet network of claim 16 wherein said first medium is fiber and said second medium is copper.

18. The Ethernet network of claim 11 wherein said first autonegotiation circuit of said first network device identifies when said second network device sends idle code groups that are followed by data code groups during said predetermined period and prevents said first autonegotiation circuit from returning to an autonegotiation enable state.

19. The Ethernet network of claim 18 wherein said first autonegotiation circuit suppresses assertion of a RUDI(INVALID) signal when said second network device sends idle code groups that are followed by data code groups during said predetermined period.

20. An Ethernet network comprising:
a first network device including a first physical layer device with a receiver and a first autonegotiation circuit having an ability detect state and including a bypass timer that determines a predetermined period;
a first medium; and
a second network device that includes a second physical layer device and that communicates over said first medium with said first network device,
wherein said first network device enables autonegotiation bypass and establishes a link with said second network device after said predetermined period during which a link between said first and second network devices is not up, said receiver of said first physical layer device is in sync, and said ability detect state of said first autonegotiation circuit is true, and
wherein said first autonegotiation circuit of said first network device identifies when said second network device sends idle code groups that are followed by data code groups during said predetermined period and prevents said first autonegotiation circuit from returning to an autonegotiation enable state.

21. The Ethernet network of claim 20 wherein when said predetermined period expires, said first autonegotiation circuit brings up said link using default settings.

22. The Ethernet network of claim 20 wherein said first autonegotiation circuit resets said predetermined period of said bypass timer when at least one of configuration code groups and corrupt data are received from said second network device.

23. The Ethernet network of claim 22 wherein said second physical layer device includes a second autonegotiation circuit that sends said at least one of consecutive, non-matching configuration code groups and corrupt data to said first network device to delay autonegotiation bypass.

24. The Ethernet network of claim 20 wherein said second network device is an interface converter.

25. The Ethernet network of claim 24 wherein said interface converter is a gigabit interface converter.

26. The Ethernet network of claim 24 wherein said interface converter includes a third physical layer device with a third autonegotiation circuit and further comprising:
a second medium that communicates with said third physical layer device of said interface converter; and
a third network device that includes a fourth physical layer device with a fourth autonegotiation circuit and that communicates with said third physical layer device of said interface converter over said second medium.

27. The Ethernet network of claim 26 wherein said first medium is fiber and said second medium is copper.

28. The Ethernet network of claim 20 wherein said first autonegotiation circuit suppresses assertion of a RUDI(INVALID) signal when said second network device sends idle code groups that are followed by data code groups during said predetermined period.

29. A method of operating a network device, comprising:
providing a first network device including a first physical layer device with a receiver and a first autonegotiation circuit having an ability detect state; and
enabling autonegotiation bypass and establishing a link with a second network device after a predetermined period during which a link between said first network device and the second network device is not up, said receiver of said first physical layer device is in sync, and said ability detect state of said first autonegotiation circuit is true.

30. The method of claim 29 further comprising bringing up said link with said first autonegotiation circuit using default settings when said predetermined period expires.

31. The method of claim 29 further comprising resetting said predetermined period when at least one of configuration code groups and corrupt data are received from said second network device.

32. The method of claim 31 further comprising sending said at least one of consecutive, non-matching configuration code groups and said corrupt data to said first network device to delay bypass using a second autonegotiation circuit of said second physical layer device.

33. The method of claim 29 wherein said second network device is an interface converter.

34. The method of claim 33 wherein said interface converter is a gigabit interface converter.

35. The method of claim 33 wherein said interface converter includes a third physical layer device with a third autonegotiation circuit and further comprising:
a second medium that communicates with said third physical layer device of said interface converter; and
a third network device that includes a fourth physical layer device with a fourth autonegotiation circuit and that communicates with said third physical layer device of said interface converter over said second medium.

36. The method of claim 35 wherein said first medium is fiber and said second medium is copper.

37. The method of claim 29 further comprising:
identifying when said second network device sends idle code groups that are followed by data code groups during said predetermined period using said first autonegotiation circuit; and
preventing said first autonegotiation circuit from returning to an autonegotiation enable state.

38. The method of claim 37 further comprising suppressing assertion of a RUDI(INVALID) signal when said second network device sends idle code groups that are followed by data code groups during said predetermined period using said first autonegotiation circuit.

39. A method of operating a network device, comprising:
providing a first network device including a first physical layer device with a receiver and a first autonegotiation circuit having an ability detect state;
enabling autonegotiation bypass and establishing a link with a second network device after a predetermined period during which a link between said first network device and the second network device is not up, said receiver of said first physical layer device is in sync, and said ability detect state of said first autonegotiation circuit is true; and
resetting said predetermined period using said first autonegotiation circuit when at least one of configuration code groups and corrupt data are received from said second network device.

40. The method of claim 39 further comprising bringing up said link using default settings when said predetermined period expires using said first autonegotiation circuit.

41. The method of claim 39 further comprising sending at least one of consecutive, non-matching configuration code groups and corrupt data to said first network device to delay bypass using a second autonegotiation circuit of said second physical layer device.

42. The method of claim 39 wherein said second network device is an interface converter.

43. The method of claim 42 wherein said interface converter is a gigabit interface converter.

44. The method of claim 42 said interface converter includes a third physical layer device with a third autonegotiation circuit and further comprising:
a second medium that communicates with said third physical layer device of said interface converter; and
a third network device that includes a fourth physical layer device with a fourth autonegotiation circuit and that communicates with said third physical layer device of said interface converter over said second medium.

45. The method of claim 44 wherein said first medium is fiber and said second medium is copper.

46. The method of claim 39 further comprising:
identifying when said second network device sends idle code groups that are followed by data code groups during said predetermined period; and
preventing said first autonegotiation circuit from returning to an autonegotiation enable state.

47. The method of claim 46 further comprising suppressing assertion of RUDI(INVALID) signal when said second network device sends idle code groups that are followed by data code groups during said predetermined period.

48. A method of operating a network device, comprising:
providing a first network device including a first physical layer device with a receiver and a first autonegotiation circuit having an ability detect state;
enabling autonegotiation bypass and establishing a link with a second network device after a predetermined period during which a link between said first network device and the second network device is not up, said receiver of said first physical layer device is in sync, and said ability detect state of said first autonegotiation circuit is true; and
identifying when said second network device sends idle code groups that are followed by data code groups during said predetermined period using said first autonegotiation circuit and preventing said first autonegotiation circuit from returning to an autonegotiation enable state.

49. The method of claim 48 wherein when said predetermined period expires, said first autonegotiation circuit brings up said link using default settings.

50. The method of claim 48 further comprising resetting said predetermined period when at least one of configuration code groups and corrupt data are received from said second network device using said first autonegotiation circuit.

51. The method of claim 50 further comprising sending said at least one of consecutive, non-matching configuration code groups and corrupt data to said first network device to delay autonegotiation bypass using a second autonegotiation circuit of said second physical layer device.

52. The method of claim 48 wherein said second network device is an interface converter.

53. The method of claim 52 wherein said interface converter is a gigabit interface converter.

54. The method of claim 52 wherein said interface converter includes a third physical layer device with a third autonegotiation circuit and further comprising:
a second medium that communicates with said third physical layer device of said interface converter; and
a third network device that includes a fourth physical layer device with a fourth autonegotiation circuit and that communicates with said third physical layer device of said interface converter over said second medium.

55. The method of claim 54 wherein said first medium is fiber and said second medium is copper.

56. The method of claim 48 wherein said first autonegotiation circuit suppresses assertion of a RUDI(INVALID) signal when said second network device sends idle code groups that are followed by data code groups during said predetermined period.

57. A first network device in an Ethernet network, comprising:
a first physical layer device including:
a receiver;
a first autonegotiation circuit having an ability detect state; and
a bypass timer that determines a predetermined period, wherein said first network device enables autonegotiation bypass and establishes a link with a second network device after said predetermined period during which a link between said first network device and the second network device is not up, said receiver of said first physical layer device is in sync, and said ability detect state of said first autonegotiation circuit is true.

58. The first network device of claim 57 wherein when said predetermined period expires, said first autonegotiation circuit brings up said link using default settings.

59. The first network device of claim 57 wherein said first autonegotiation circuit resets said predetermined period of said bypass timer when at least one of configuration code groups and corrupt data are received from the second network device.

60. The first network device of claim 57 wherein said first autonegotiation circuit of said first network device identifies when the second network device sends idle code groups that are followed by data code groups during said predetermined period and prevents said first autonegotiation circuit from returning to an autonegotiation enable state.

61. The first network device of claim 60 wherein said first autonegotiation circuit suppresses assertion of RUDI(INVALID) signal when the second network device sends idle code groups that are followed by data code groups during said predetermined period.

62. A first network device in an Ethernet network, comprising:
a first physical layer device including:
a receiver;
a first autonegotiation circuit having an ability detect state; and
a bypass timer that determines a predetermined period, wherein said first network device enables autonegotiation bypass and establishes a link with a second network device after said predetermined period during which a link between said first network device and the second network device is not up, said receiver of said first physical layer device is in sync, and said ability detect state of said first autonegotiation circuit is true, and
wherein said first autonegotiation circuit resets said predetermined period of said bypass timer when at least one of configuration code groups and corrupt data are received from the second network device.

63. The first network device of claim 62 wherein when said predetermined period expires, said first autonegotiation circuit brings up said link using default settings.

64. The first network device of claim 62 wherein said first autonegotiation circuit identifies when the second network device sends idle code groups that are followed by data code groups during said predetermined period and prevents said first autonegotiation circuit from returning to an autonegotiation enable state.

65. The first network device of claim 64 wherein said first autonegotiation circuit suppresses assertion of RUDI(IN- VALID) signal when the second network device sends idle code groups that are followed by data code groups during said predetermined period.

66. A first network device in an Ethernet network, comprising:
a first physical layer device including:
a receiver;
a first autonegotiation circuit having an ability detect state; and
a bypass timer that determines a predetermined period,
wherein said first network device enables autonegotiation bypass and establishes a link with a second network device after said predetermined period during which a link between said first network device and the second network device is not up, said receiver of said first physical layer device is in sync, and said ability detect state of said first autonegotiation circuit is true, and
wherein said first autonegotiation circuit of said first network device identifies when the second network device sends idle code groups that are followed by data code groups during said predetermined period and prevents said first autonegotiation circuit from returning to an autonegotiation enable state.

67. The first network device of claim 66 wherein when said predetermined period expires, said first autonegotiation circuit brings up said link using default settings.

68. The first network device of claim 66 wherein said first autonegotiation circuit resets said predetermined period of said bypass timer when at least one of configuration code groups and corrupt data are received from the second network device.

69. The first network device of claim 66 wherein said first autonegotiation circuit suppresses assertion of RUDI(IN-VALID) signal when the second network device sends idle code groups that are followed by data code groups during said predetermined period.

70. A first network device in an Ethernet network, comprising:
first physical layer means for providing an interface to a first medium and including:
receiving means for receiving signals on the first medium;
first autonegotiation means for negotiating link parameters and having an ability detect state; and
bypass timing means for determining a predetermined period,
wherein said first network device enables autonegotiation bypass and establishes a link with a second network device after said predetermined period during which a link between said first network device and the second network device is not up, said receiving means of said first physical layer means is in sync, and said ability detect state of said first autonegotiation means is true.

71. The first network device of claim 70 wherein when said predetermined period expires, said first autonegotiation means brings up said link using default settings.

72. The first network device of claim 70 wherein said first autonegotiation means resets said predetermined period of said bypass timing means when at least one of configuration code groups and corrupt data are received from the second network device.

73. The first network device of claim 70 wherein said first autonegotiation means of said first network device identifies when the second network device sends idle code groups that are followed by data code groups during said predetermined period and prevents said first autonegotiation means from returning to an autonegotiation enable state.

74. The first network device of claim 73 wherein said first autonegotiation means suppresses assertion of RUDI(IN-VALID) signal when the second network device sends idle code groups that are followed by data code groups during said predetermined period.

75. A first network device in an Ethernet network, comprising:
first physical layer means for providing an interface to a first medium and including:
receiving means for receiving signals on the first medium;
first autonegotiation means for negotiating link parameters and having an ability detect state; and
bypass timing means for determining a predetermined period,
wherein said first network device enables autonegotiation bypass and establishes a link with a second network device after said predetermined period during which a link between said first network device and the second network device is not up, said receiving means of said first physical layer means is in sync, and said ability detect state of said first autonegotiation means is true, and
wherein said first autonegotiation means resets said predetermined period of said bypass timing means when at least one of configuration code groups and corrupt data are received from the second network device.

76. The first network device of claim 75 wherein when said predetermined period expires, said first autonegotiation means brings up said link using default settings.

77. The first network device of claim 75 wherein said first autonegotiation means identifies when the second network device sends idle code groups that are followed by data code groups during said predetermined period and prevents said first autonegotiation means from returning to an autonegotiation enable state.

78. The first network device of claim 77 wherein said first autonegotiation means suppresses assertion of RUDI(IN-VALID) signal when the second network device sends idle code groups that are followed by data code groups during said predetermined period.

79. A first network device in an Ethernet network, comprising:
first physical layer means for providing an interface to a first medium and including:
receiving means for receiving signals on the first medium;
first autonegotiation means for negotiating link parameters and having an ability detect state; and
bypass timing means for determining a predetermined period,
wherein said first network device enables autonegotiation bypass and establishes a link with the second network device after said predetermined period during which a link between said first network device and the second network device is not up, said receiving means of said first physical layer means is in sync, and said ability detect state of said first autonegotiation means is true, and
wherein said first autonegotiation means of said first network device identifies when the second network device sends idle code groups that are followed by data code groups during said predetermined period and prevents said first autonegotiation means from returning to an autonegotiation enable state.

80. The first network device of claim 79 wherein when said predetermined period expires, said first autonegotiation means brings up said link using default settings.

81. The first network device of claim 79 wherein said first autonegotiation means resets said predetermined period of said bypass timing means when at least one of configuration code groups and corrupt data are received from the second network device.

82. The first network device of claim 79 wherein said first autonegotiation means suppresses assertion of RUDI(IN-VALID) signal when the second network device sends idle code groups that are followed by data code groups during said predetermined period.

* * * * *

UNITED STATES PATENT AND TRADEMARK OFFICE
CERTIFICATE OF CORRECTION

PATENT NO. : 7,242,693 B1
APPLICATION NO. : 10/364602
DATED : July 10, 2007
INVENTOR(S) : Yatin Acharya et al.

It is certified that error appears in the above-identified patent and that said Letters Patent is hereby corrected as shown below:

Column 4, Line 43   Delete "the sending" after "sending"
Column 8, Line 46   Insert -- wherein -- after "14"
Column 11, Line 1   insert -- wherein -- after "42"

Signed and Sealed this

Sixth Day of November, 2007

JON W. DUDAS
*Director of the United States Patent and Trademark Office*